(12) United States Patent
Lee

(10) Patent No.: US 7,422,324 B2
(45) Date of Patent: Sep. 9, 2008

(54) ILLUMINATING DEVICE OF EYEGLASSES

(76) Inventor: Ching-Hui Lee, No. 4, Turnpike Right Side, Yishan Village, Shrling Township, Huadu District, Guangzhou City, Guangdong Province (CN)

( * ) Notice: Subject to any disclaimer, the term of this patent is extended or adjusted under 35 U.S.C. 154(b) by 202 days.

(21) Appl. No.: 11/362,856

(22) Filed: Feb. 28, 2006

(65) Prior Publication Data

US 2007/0200999 A1 Aug. 30, 2007

(51) Int. Cl.
*G02C 1/00* (2006.01)
(52) U.S. Cl. .......................... 351/158; 351/41
(58) Field of Classification Search .................. 351/41, 351/111, 121, 158
See application file for complete search history.

(56) References Cited

U.S. PATENT DOCUMENTS 5,722,762 A * 3/1998 Soll ............................ 362/105
2007/0013864 A1 * 1/2007 Dietz .......................... 351/155

* cited by examiner

*Primary Examiner*—Huy K Mai
(74) *Attorney, Agent, or Firm*—Rosenberg, Klein & Lee

(57) ABSTRACT

A pair of eyeglasses is equipped an illuminating device; hollow housing parts are pivoted to respective ones of front end portions of temples of the eyeglasses, and adjustable in position; the temples each have a battery box formed thereon; the illuminating device includes a light emitting element held in each one of hollow housing parts, a wire connected to each one of the light emitting elements at one end, and a battery set held in each one of the battery boxes and connected to the other end of each one of the wires.

15 Claims, 6 Drawing Sheets

ILLUMINATING DEVICE OF EYEGLASSES

BACKGROUND OF THE INVENTION

1. Field of the Invention

The present invention relates to an illuminating device of eyeglasses, more particularly one, which fitted on a frame of a pair of eyeglasses.

2. Brief Description of the Prior Art

Common eyeglasses include a frame, and lenses fitted to the frame. Various kinds of eyeglasses are available to serve different purposes, e.g. to correct eyesight, protect eyes from sun, wind and dust, adorn face, and to match clothing.

People's living standard has heightened to a great extent with progress in industry, and most eyeglasses manufacturers are aware that conventional eyeglasses, which serve single function, can no longer satisfy modern consumers' need. Therefore, they are devoted to developing novel and multifunctional eyeglasses to attract modern consumers.

SUMMARY OF THE INVENTION

It is a main object of the present invention to provide an improvement on a pair of eyeglasses so that the eyeglasses serve more functions. The eyeglasses of the present invention are equipped an illuminating device. Each one of front end portions of the temples of the eyeglasses has a hollow housing parts pivoted thereto. The temples each have a battery box formed thereon. The illuminating device includes a light emitting element held in each one of hollow housing parts, a wire connected to each one of the light emitting elements at one end, and a battery set held in each one of the battery boxes and connected to the other end of a corresponding wire. Therefore, the eyeglasses have illuminating function. And, the wearer is allowed to adjust the position of the housing parts so that light emitted from the light emitting elements is projected in the direction, which he is looking.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
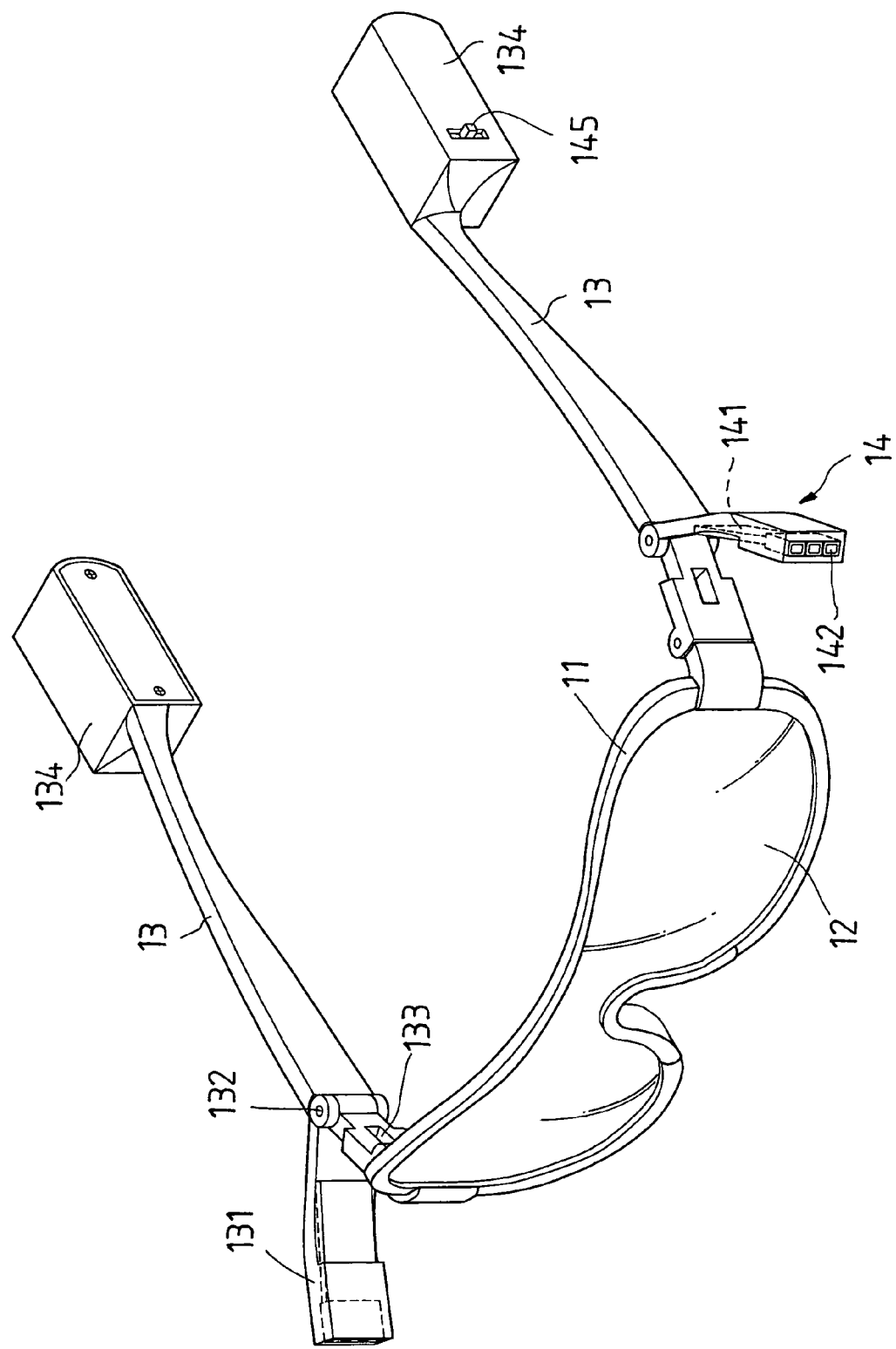
FIG. 1 is a perspective view of the present invention.
Figure 2:
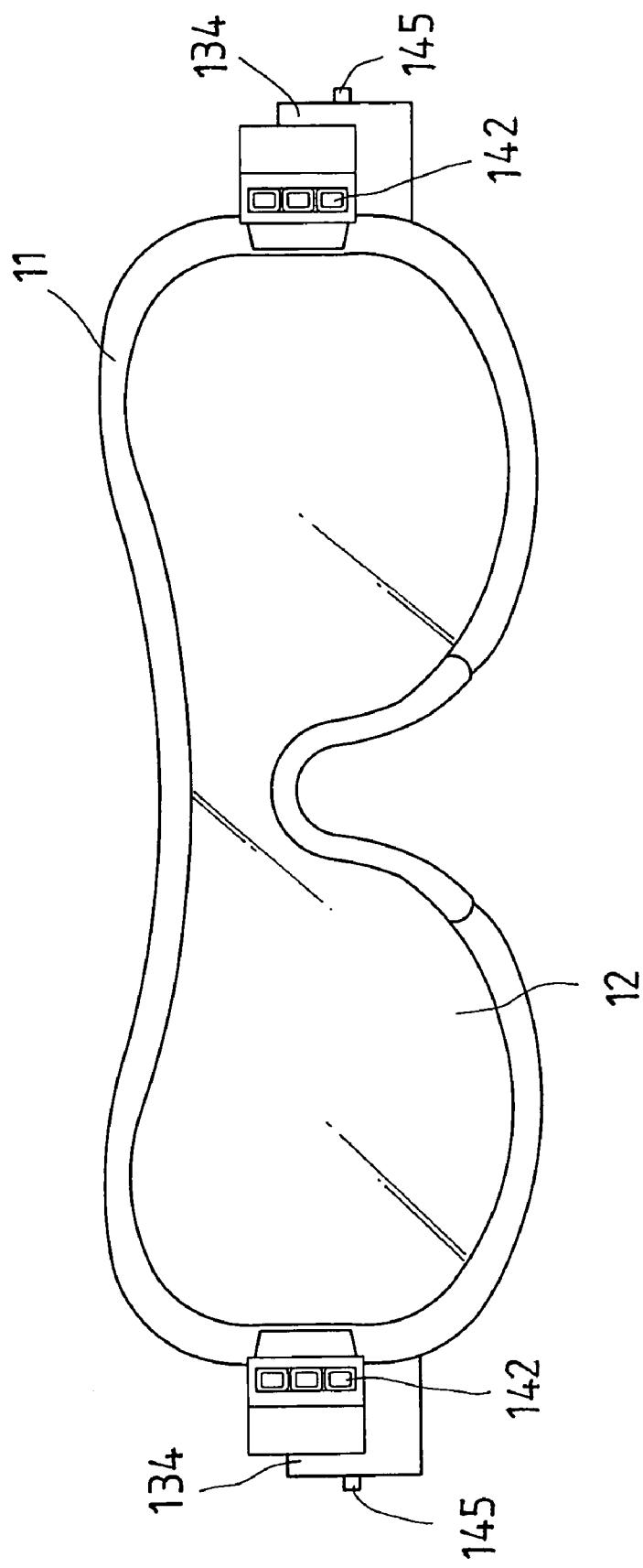
FIG. 2 is a front view of the present invention.
Figure 3:
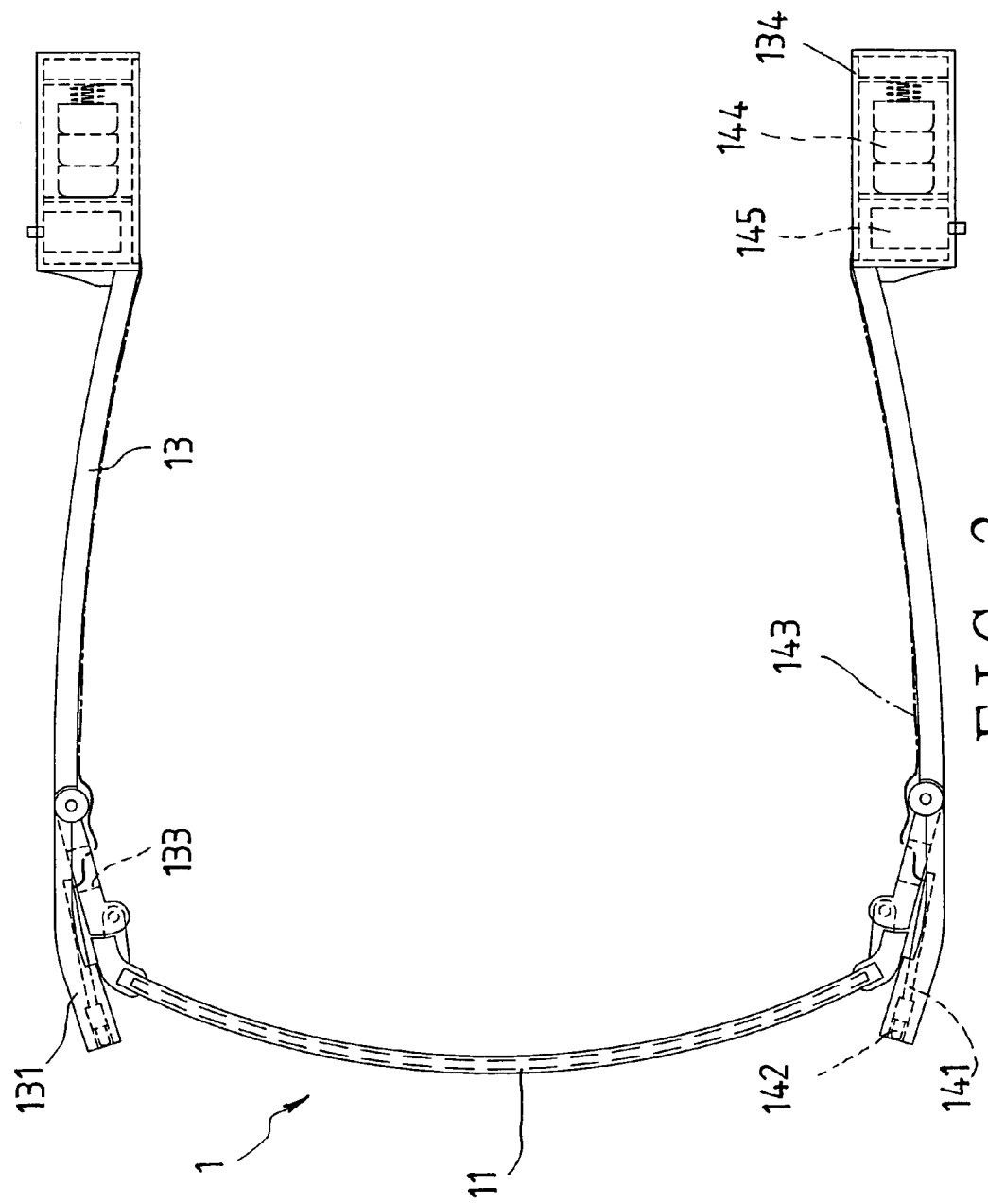
FIG. 3 is a top view of the present invention.

Referring to FIGS. 1 to 3, a pair of eyeglasses 1 have a frame 11, lenses 12 fitted in the frame 11, temples 13 separably connected to two ends of the frame 11, and hollow housing parts 131, which are pivoted to respective ones of front end portions of the temples 13 by means of hinges 132 so as to be adjustable in position; the frame 11 can be plastic or metallic, and comes in various shapes. The temples 13 each have a through hole 133 on the front end portion thereof, and a battery box 134 thereon, which is formed together with the temple 13.

An illuminating device 14 is fitted to the temples 13 of the eyeglasses 1. The illuminating device 14 includes circuit control elements 141, light emitting elements 142, wires 143, battery sets 144, and switch elements 145. The light emitting elements 142 are made of light emitting diodes, and held in respective ones of the hollow housing parts 131. The circuit control elements 141 are held in respective ones of the hollow housing parts 131, and connected to corresponding light emitting elements 142 for making the light emitting elements 142 to flash repeatedly. The battery sets 144 are held in respective ones of the battery boxes 134 on the temples 13. The wires 143 are connected to the circuit control elements 141 at first ends and passed through the through holes 133 of the temples 13, and touch and extend along inward sides of the temples 13. Furthermore, the wires 143 are connected to the battery sets 144 at the other ends. Each of the switch elements 145 is interposed between one of the battery sets 144 and the corresponding light emitting element 142 for turning on/off a circuit consisting of the battery set 144, the circuit control element 141, and the light emitting element 142.

Figure 4:
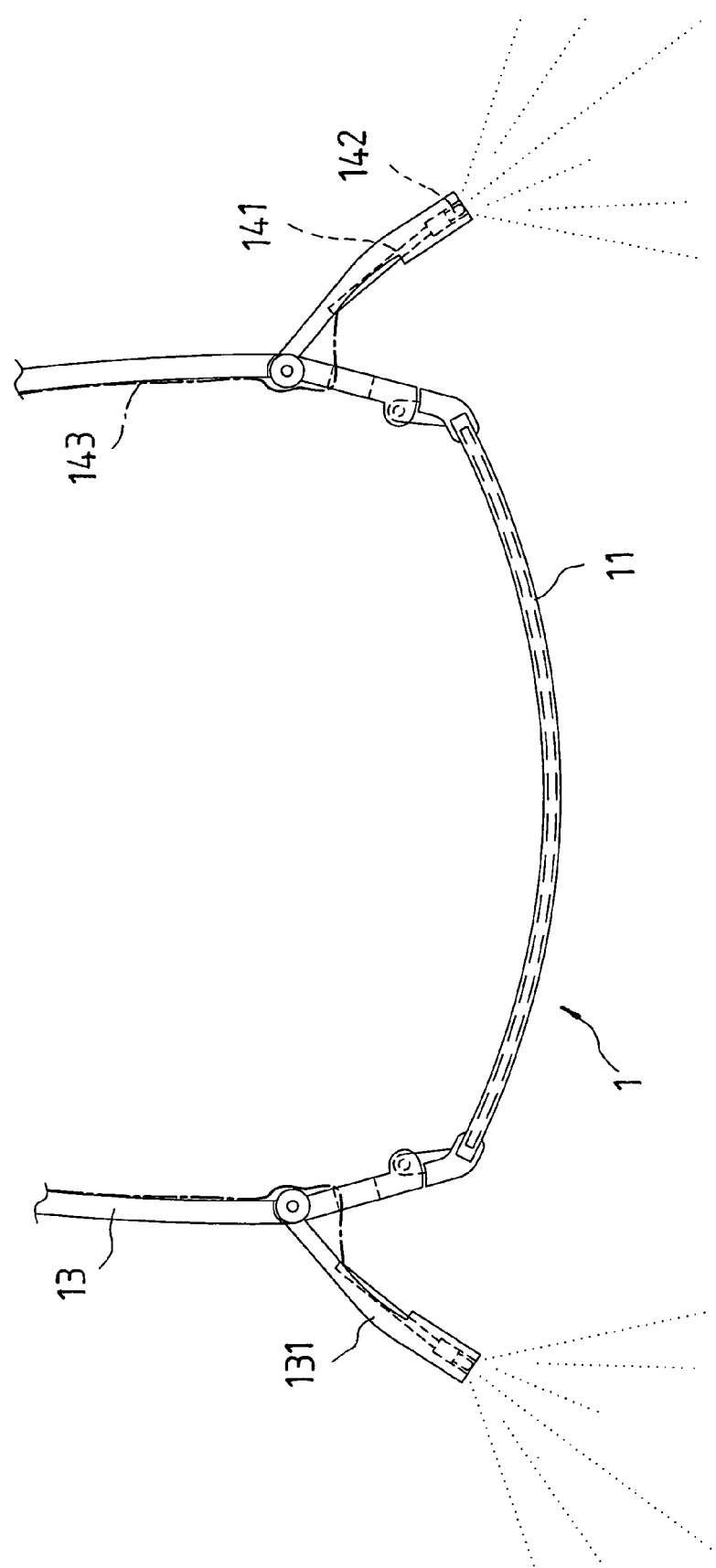
FIG. 4 is a view of the present invention in use.

Referring to FIGS. 1, 3, and 4, when the user move the switch elements 145 to turn on the circuits, the light emitting elements 142 will start emitting light, and the circuit control elements 141 will make the light emitting elements 142 flash repeatedly, thus making other people notice the wearer of the eyeglasses. Therefore, when the wearer is riding a motorcycle or bicycle in the dark, other people will notice the wearer easily owing to light emitted from the light emitting elements 142, which are made to flash repeatedly with the circuit control elements 141, thus avoiding accidents. And, the wearer is allowed to adjust the position of the housing parts 131 so that light emitted from the light emitting elements 142 is projected onto objects, which the wearer is looking at.

Figure 5:
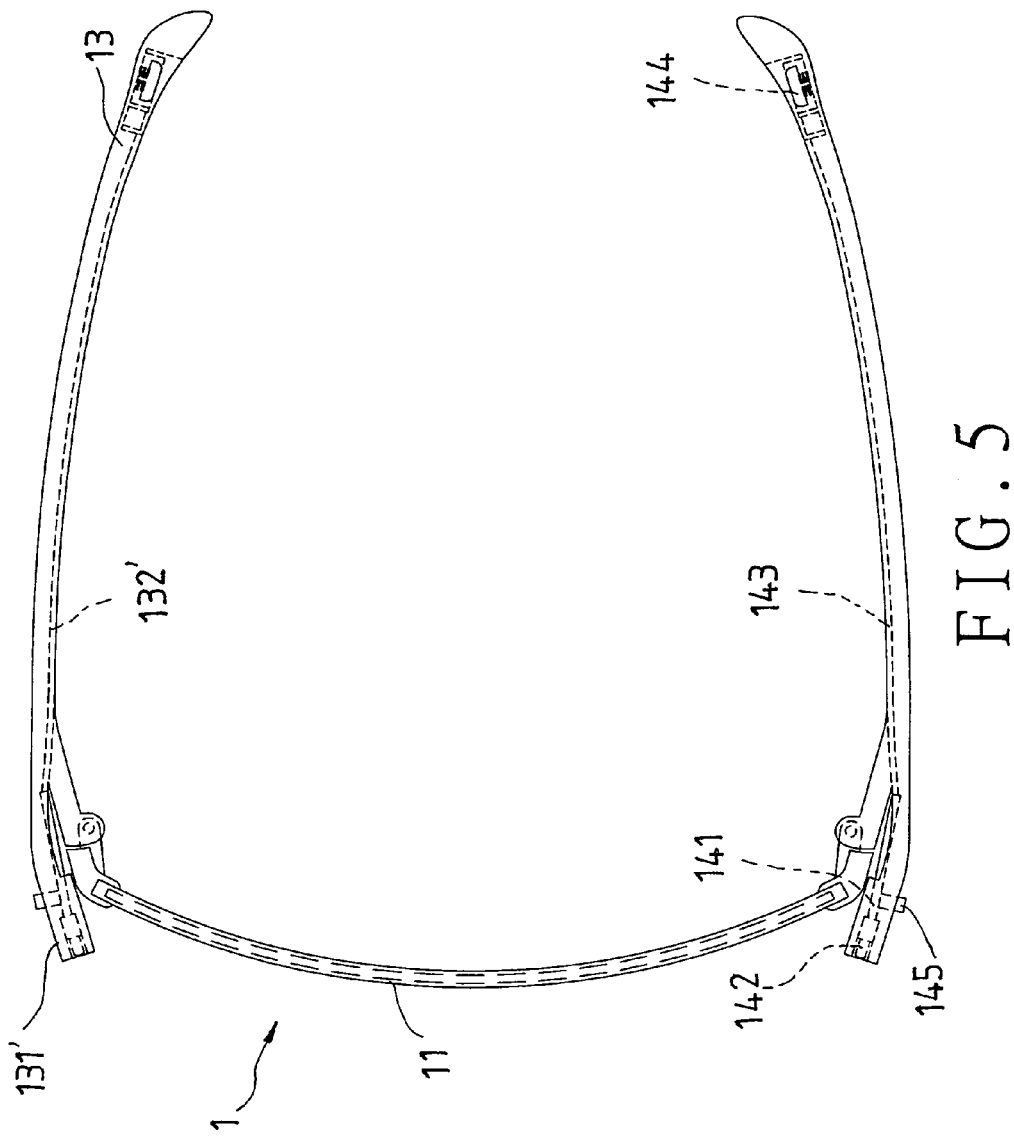
FIG. 5 is a top view of the second preferred embodiment of the present invention.

FIG. 5 shows a second preferred embodiment of the present invention; hollow housing parts 131', which are formed together with temples 13' of a pair of eyeglasses, are connected to respective ones of front end portions of the temples 13'. Each of the temples 13' has a groove 132' on an inward side thereof. The eyeglasses have an illuminating device 14 fitted thereto, which includes circuit control elements 141, light emitting elements 142, wires 143, battery sets 144, and switch elements 145. The light emitting elements 142 are held in respective ones of the hollow housing parts 131'. The circuit control elements 141 are held in respective ones of the hollow housing parts 131', and connected to the wires 143 respectively. The wires 143 are passed through the temples 13' and held in the grooves 132' formed on the inward sides of the temples 13' respectively. The battery sets 144 are held in the temples 13', and connected to the other ends of the wires 143 respectively. The switch elements 145 are each interposed between one of the battery sets 144 and the corresponding light emitting element 142 for turning on/off the circuit, and they are fitted on respective ones of the hollow housing parts 131'.

Figure 6:
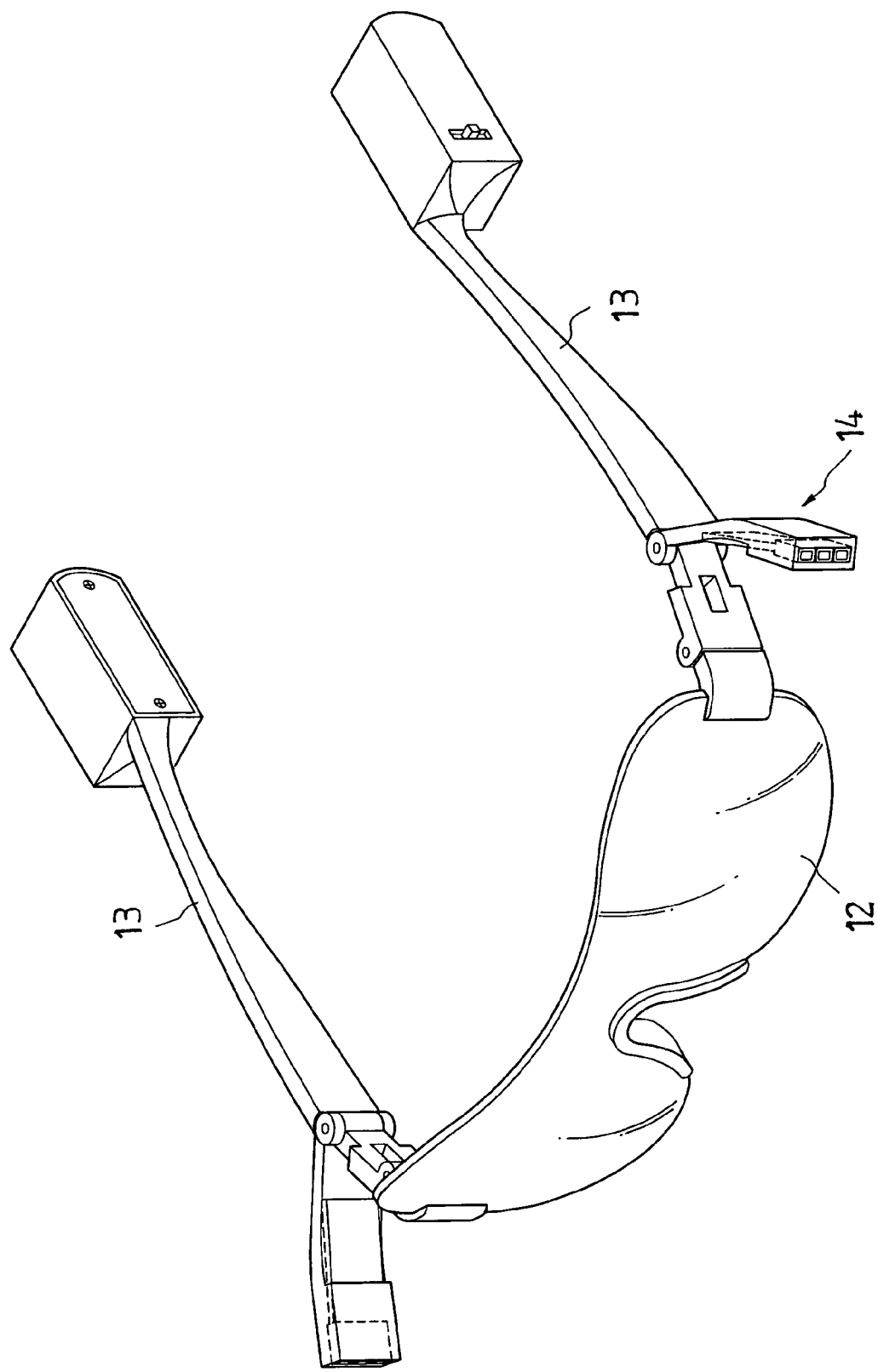
FIG. 6 is a perspective view of the third preferred embodiment.

FIG. 6 shows a third preferred embodiment of the present invention; the temples 13 (13') are directly connected to two ends of the lenses 12 of the eyeglasses 1 instead.

From the above description, it can be easily seen that the illuminating device of eyeglasses has the following advantages:

1. The illuminating device can be used instead of flashlights in the dark. Consequently, the wearer of the eyeglasses has two hands free for doing their work because he doesn't have to hold a flashlight.

2. The wearer is allowed to adjust the position of the housing parts so that light emitted from the light emitting elements is projected in the direction, which the wearer is looking. Therefore, the present invention has an excellent illuminating effect.

3. Other people will notice the wearer easily owing to light emitted from the light emitting elements, which are made to flash repeatedly with the circuit control elements, when the wearer is riding a motorcycle or bicycle in the dark, thus avoiding accidents.

4. The wires are held in the grooves on the inward sides of the temples therefore they can't spoil the pleasant look of the eyeglasses.

What is claimed is:

1. An illuminating device of eyeglasses, comprising:
    a pair of temples coupled to a frontal portion of a pair of eyeglasses;
    a pair of hollow housing parts pivotally connected to respective ones of said temples at respective pivot points, said pivot points being rearwardly displaceable with respect to said frontal portions of said eyeglasses;
    a light emitting element held in each of said hollow housing parts, said hollow housing parts being rotatably pivotal with respect to said temples in a selective manner;
    a wire connected to each one of the light emitting elements at one end; and
    a battery set held in each one of the temples and connected to other end of each one of the wires.

2. The illuminating device of eyeglasses as recited in claim 1, wherein a circuit control element is disposed between and connected to, each of the battery sets and a corresponding light emitting element for making the light emitting element flash repeatedly.

3. The illuminating device of eyeglasses as recited in claim 1, wherein each of the temples has a battery box at a rear end thereof, and the battery sets are held in respective ones of the battery boxes.

4. The illuminating device of eyeglasses as recited in claim 1, wherein each of the temples has a groove on an inward side thereof, and the wires are held in the grooves.

5. The illuminating device of eyeglasses as recited in claim 1, wherein a switch element is disposed between and connected to, each of the battery sets and a corresponding light emitting element.

6. The illuminating device of eyeglasses as recited in claim 1, wherein the frontal portions of said eyeglasses include a pair of lenses and said temples are directly connected to two ends of said pair of lenses of the eyeglasses.

7. The illuminating device of eyeglasses as recited in claim 1, wherein the temples are connected to two ends of a frame of the eyeglasses.

8. The illuminating device of eyeglasses as recited in claim 7, wherein the frame is plastic.

9. The illuminating device of eyeglasses as recited in claim 7, wherein the frame is metallic.

10. The illuminating device of eyeglasses as recited in claim 7, wherein the frame is formed of various shapes.

11. An illuminating device of eyeglasses, comprising a pair of hollow housing parts formed on each one of respective front end portions of temples of a pair of eyeglasses, said hollow housing parts being pivotally coupled to each of said temples for selective rotation of each of said hollow housing parts with respect to respective temples;
    a light emitting element held in each one of the hollow housing parts;
    a wire connected to each one of the light emitting elements at one end; and
    a battery set held in each one of the temples and connected to other end of each one of the wires.

12. The illuminating device of eyeglasses as recited in claim 11, wherein a circuit control element is disposed between and connected to each of the battery sets and a corresponding light emitting element for making the light emitting element flash repeatedly.

13. The illuminating device of eyeglasses as recited in claim 11, wherein each of the temples has a battery box at a rear end thereof, and the battery sets are held in respective ones of the battery boxes.

14. The illuminating device of eyeglasses as recited in claim 11, wherein each of the temples has a groove on an inward side thereof, and the wires are held in the grooves.

15. The illuminating device of eyeglasses as recited in claim 11, wherein a switch element is disposed between and connected to each of the battery sets and a corresponding light emitting element.

* * * * *